(12) United States Patent
Molin et al.

(10) Patent No.: US 8,639,079 B2
(45) Date of Patent: Jan. 28, 2014

(54) MULTIMODE OPTICAL FIBER

(75) Inventors: Denis Molin, Draveil (FR); Marianne Bigot-Astruc, Marcoussi (FR); Pierre Sillard, Le Chesnay (FR); Franciscus Johannes Achten, Tilburg (NL)

(73) Assignee: Draka Comteq, B.V., Amsterdam (NL)

( * ) Notice: Subject to any disclaimer, the term of this patent is extended or adjusted under 35 U.S.C. 154(b) by 119 days.

(21) Appl. No.: 13/434,101

(22) Filed: Mar. 29, 2012

(65) Prior Publication Data

US 2012/0251062 A1  Oct. 4, 2012

(30) Foreign Application Priority Data

Mar. 29, 2011  (EP) .................................. 11305344

(51) Int. Cl.
*G02B 6/028* (2006.01)
*G02B 6/02* (2006.01)

(52) U.S. Cl.
USPC .......................................... 385/124; 385/123

(58) Field of Classification Search
USPC ........................................................ 385/124
See application file for complete search history.

(56) References Cited

U.S. PATENT DOCUMENTS

| | | |
|---|---|---|
| 4,111,525 A | 9/1978 | Kaminow et al. |
| 4,184,744 A | 1/1980 | Onoda et al. |
| 4,222,631 A | 9/1980 | Olshansky |
| 4,229,070 A | 10/1980 | Olshansky et al. |
| 4,230,396 A | 10/1980 | Olshansky et al. |
| 4,339,174 A | 7/1982 | Levin |
| 4,406,517 A | 9/1983 | Olshansky |
| 4,465,335 A | 8/1984 | Eppes |
| 4,636,235 A | 1/1987 | Glessner et al. |
| 4,636,236 A | 1/1987 | Glessner et al. |
| 4,653,042 A | 3/1987 | d'Auria et al. |
| 4,715,695 A | 12/1987 | Nishimura et al. |
| 4,723,828 A | 2/1988 | Garel-Jones et al. |
| 4,838,643 A | 6/1989 | Hodges et al. |
| 5,142,603 A | 8/1992 | Forrester |
| 5,194,714 A | 3/1993 | Le Sergent |
| 5,278,687 A | 1/1994 | Jannson et al. |
| 5,381,503 A | 1/1995 | Kanamori et al. |

(Continued)

FOREIGN PATENT DOCUMENTS

| | | |
|---|---|---|
| EP | 0131729 A1 | 1/1985 |
| EP | 1921478 A1 | 5/2008 |

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

(Continued)

*Primary Examiner* — Rhonda Peace
(74) *Attorney, Agent, or Firm* — Additon, Higgins, Pendleton & Ashe, P.C.

(57) ABSTRACT

A multimode optical fiber includes a central core surrounded by an outer cladding. The central core has a graded-index profile with respect to the outer cladding and an outer radius $r_1$ of between about 22 microns and 28 microns. The optical fiber also includes an inner cladding positioned between the central core and the outer cladding, and a depressed trench positioned between the inner cladding and the outer cladding. The multimode optical fiber exhibits reduced bending losses.

22 Claims, 2 Drawing Sheets

(56) References Cited

U.S. PATENT DOCUMENTS

| | | |
|---|---|---|
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,534 B2 | 9/2003 | Abbott, III et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,164,835 B2 * | 1/2007 | Matsuo et al. ................ 385/127 |
| 7,228,032 B2 | 6/2007 | Blauvelt et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,450,807 B2 * | 11/2008 | Bickham et al. ................ 385/126 |
| 7,483,612 B2 | 1/2009 | Digiovanni et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,555,187 B2 * | 6/2009 | Bickham et al. ................ 385/127 |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,603,015 B2 * | 10/2009 | Bickham et al. ................ 385/127 |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,257 B2 | 10/2010 | Takenaga et al. |
| 7,817,891 B2 | 10/2010 | Lavenne et al. |
| 7,826,691 B2 | 11/2010 | Matthijsse et al. |
| 7,865,050 B1 | 1/2011 | Sun |
| 7,878,712 B2 | 2/2011 | Shimotakahara et al. |
| 7,889,960 B2 | 2/2011 | de Montmorillon et al. |
| 7,903,917 B2 * | 3/2011 | Bickham et al. ................ 385/124 |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,026 B2 | 3/2012 | Overton et al. |
| 8,145,027 B2 | 3/2012 | Overton et al. |
| 8,184,936 B2 | 5/2012 | Zhang et al. |
| 8,280,213 B2 * | 10/2012 | Molin et al. ................... 385/127 |
| 8,297,854 B2 * | 10/2012 | Bickham et al. ................ 385/78 |
| 8,385,704 B2 * | 2/2013 | Molin et al. ................... 385/127 |
| 8,406,592 B2 * | 3/2013 | Abbott et al. ................ 385/124 |
| 8,406,593 B2 * | 3/2013 | Molin et al. ................... 385/124 |
| 8,428,410 B2 * | 4/2013 | Molin et al. ................... 385/124 |
| 8,467,649 B2 * | 6/2013 | Bickham et al. ................ 385/127 |
| 8,520,994 B2 * | 8/2013 | Kim et al. ..................... 385/127 |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0247269 A1 | 12/2004 | Hirano et al. |
| 2005/0008312 A1 | 1/2005 | Jang et al. |
| 2006/0039665 A1 | 2/2006 | Matsuo et al. |
| 2007/0172182 A1 | 7/2007 | Lee et al. |
| 2008/0166094 A1 | 7/2008 | Bookbinder et al. |
| 2008/0279517 A1 * | 11/2008 | Bickham et al. ................ 385/124 |
| 2008/0292262 A1 | 11/2008 | Overton et al. |
| 2009/0059353 A1 | 3/2009 | Fini |
| 2009/0060437 A1 | 3/2009 | Fini et al. |
| 2009/0092365 A1 | 4/2009 | Donlagic |
| 2009/0154888 A1 | 6/2009 | Abbott et al. |
| 2009/0169163 A1 | 7/2009 | Abbott et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0092135 A1 | 4/2010 | Barker et al. |
| 2010/0092138 A1 | 4/2010 | Overton |
| 2010/0118388 A1 | 5/2010 | Pastouret et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |

(56) References Cited

U.S. PATENT DOCUMENTS

| | | | |
|---|---|---|---|
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0220966 A1 | 9/2010 | Bennett | |
| 2010/0254653 A1 | 10/2010 | Molin et al. | |
| 2010/0272406 A1* | 10/2010 | Bookbinder et al. | 385/124 |
| 2010/0310218 A1 | 12/2010 | Molin et al. | |
| 2011/0002590 A1 | 1/2011 | Ooizumi et al. | |
| 2011/0026889 A1 | 2/2011 | Risch et al. | |
| 2011/0037183 A1 | 2/2011 | Tudury et al. | |
| 2011/0044594 A1 | 2/2011 | Tudury et al. | |
| 2011/0044596 A1 | 2/2011 | Zhang et al. | |
| 2011/0054861 A1 | 3/2011 | Lane | |
| 2011/0054862 A1 | 3/2011 | Pimpinella et al. | |
| 2011/0058781 A1 | 3/2011 | Molin et al. | |
| 2011/0064367 A1 | 3/2011 | Molin et al. | |
| 2011/0064371 A1 | 3/2011 | Leatherman et al. | |
| 2011/0069724 A1 | 3/2011 | Richard et al. | |
| 2011/0069932 A1 | 3/2011 | Overton et al. | |
| 2011/0085770 A1 | 4/2011 | Bigot-Astruc et al. | |
| 2011/0088433 A1* | 4/2011 | Allegretto et al. | 65/378 |
| 2011/0091171 A1 | 4/2011 | Tatat et al. | |
| 2011/0116160 A1 | 5/2011 | Boivin et al. | |
| 2011/0123161 A1 | 5/2011 | Molin et al. | |
| 2011/0123162 A1 | 5/2011 | Molin et al. | |
| 2011/0135262 A1 | 6/2011 | Molin et al. | |
| 2011/0135263 A1 | 6/2011 | Molin et al. | |
| 2011/0176782 A1 | 7/2011 | Parris | |
| 2011/0188823 A1 | 8/2011 | Sillard et al. | |
| 2011/0188826 A1 | 8/2011 | Sillard et al. | |
| 2011/0194827 A1* | 8/2011 | Jiang et al. | 385/124 |
| 2011/0217011 A1* | 9/2011 | Bennett et al. | 385/124 |
| 2011/0217012 A1 | 9/2011 | Bigot-Astruc et al. | |
| 2011/0229101 A1 | 9/2011 | de Montmorillon et al. | |
| 2011/0268398 A1 | 11/2011 | Quinn et al. | |
| 2011/0268400 A1 | 11/2011 | Lovie et al. | |
| 2011/0287195 A1 | 11/2011 | Molin | |
| 2011/0305423 A1 | 12/2011 | Molin et al. | |
| 2012/0009358 A1 | 1/2012 | Gharbi et al. | |
| 2012/0014652 A1 | 1/2012 | Parris | |
| 2012/0040105 A1 | 2/2012 | Overton | |
| 2012/0040184 A1 | 2/2012 | de Montmorillon et al. | |
| 2012/0051703 A1 | 3/2012 | Bigot-Astruc et al. | |
| 2012/0057833 A1 | 3/2012 | Tatat | |
| 2012/0092651 A1 | 4/2012 | Molin et al. | |
| 2012/0134376 A1 | 5/2012 | Burov et al. | |
| 2012/0148206 A1 | 6/2012 | Boivin et al. | |
| 2012/0195549 A1 | 8/2012 | Molin et al. | |
| 2012/0195561 A1 | 8/2012 | Molin et al. | |
| 2012/0213483 A1 | 8/2012 | Risch et al. | |
| 2012/0224254 A1 | 9/2012 | Burov et al. | |
| 2012/0230638 A1* | 9/2012 | Bickham et al. | 385/124 |
| 2012/0243843 A1 | 9/2012 | Molin et al. | |
| 2012/0251062 A1 | 10/2012 | Molin et al. | |
| 2013/0028564 A1* | 1/2013 | Molin et al. | 385/124 |

FOREIGN PATENT DOCUMENTS

| | | |
|---|---|---|
| EP | 2299302 A1 | 3/2011 |
| EP | 2339384 A1 | 6/2011 |
| EP | 2506044 A1 | 3/2012 |
| EP | 2506045 A1 | 3/2012 |
| FR | 2949870 A | 3/2011 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| WO | 00/50941 A1 | 8/2000 |
| WO | 03/081301 A1 | 10/2003 |
| WO | 2005/106544 A1 | 11/2005 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |

OTHER PUBLICATIONS

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Freund, et al., "High-Speed Transmission in Multimode Fibers", Journal of Lightwave Technology, vol. 28, No. 4, Feb. 15, 2010, pp. 1-18.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

Pepeljugoski et al., "15.6-Gb/s Transmission Over 1 km of Next Generation Multimode Fiber", IEEE Photonics Technology Letters, vol. 14, No. 5, May 2002, pp. 1-3.

European Search Report in counterpart European Application No. 11305344.1 dated Sep. 11, 2012, pp. 1-6.

Gloge et al.: 'Multimode theory of graded-core fibers' Bell System Technical Journal 1973, pp. 1563-1578 [Cited in Specification].

YABRE: 'Comprehensive theory of dispersion in graded-index optical fibers' Journal of Lightwave Technology vol. 18, No. 2, Feb. 2000, pp. 166-177.

European Search Report in commonly owned European Application No. 12161943.1 dated Jun. 4, 2012, pp. 1-6.

European Office Action in counterpart European Application No. 12161943.1 dated May 15, 2013, pp. 1-5 [reference previously cited].

* cited by examiner

MULTIMODE OPTICAL FIBER

CROSS-REFERENCE TO PRIORITY APPLICATION

This application hereby claims the benefit of pending European Application No. 11305344.1 for a "Multimode Optical Fiber" (filed Mar. 29, 2011, at the European Patent Office), which is hereby incorporated by reference in its entirety.

FIELD OF THE INVENTION

The present invention relates to the field of fiber optic transmission and, more specifically, to a multimode optical fiber having reduced bending losses and a reduced number of leaky modes.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "parabolic" profile, or "triangular" profile for graphs having the respective shapes of a step, a trapezoid, a parabola, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the optical-fiber core, while the higher order modes (e.g., the LP11 mode) are strongly attenuated.

For the same propagation medium (i.e., in a step-index multimode optical fiber), the different modes have different group delay times. This difference in group delay times results in a time lag (i.e., a delay) between the pulses propagating along different radial offsets of the optical fiber. This delay causes a broadening of the resulting light pulse. Broadening of the light pulse increases the risk of the pulse being superimposed onto a trailing pulse, which reduces the bandwidth (i.e., data rate) supported by the optical fiber. The bandwidth, therefore, is linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_{max}\sqrt{1 - 2\Delta\left(\frac{r}{a}\right)^\alpha}$$

wherein, $\alpha \geq 1$, and $\alpha$ is a non-dimensional parameter that is indicative of the shape of the index profile;

$n_{max}$ is the maximum refractive index of the optical fiber's core;

a is the radius of the optical fiber's core; and $$\Delta = \frac{(n_{max}^2 - n_{min}^2)}{2 n_{max}^2}$$

where $n_{min}$ is the minimum refractive index of the multimode core, which may correspond to the refractive index of the outer cladding (most often made of silica).

By adjusting the value of the parameter $\alpha$, it is possible to obtain a group delay time that is virtually equal for all of the modes. Stated differently, the refractive index profile can be modified to reduce or even eliminate intermodal dispersion, thereby increasing bandwidth.

Typically, multimode optical fibers (MMFs) have central core diameters of about 50 microns (i.e., 50-micron MMFS) or 62.5 microns (i.e., 62.5-micron MMFS). For such multimode optical fibers, the parameter $\alpha$ is typically between about 1.9 and 2.2 and can be chosen to provide a large bandwidth at a target operating wavelength (e.g., 850 nanometers or 1300 nanometers).

Generally speaking, high bandwidth and low bending losses are desirable characteristics of multimode optical fibers for multi-gigabit Ethernet communications. One proposed method of achieving reduced bending losses involves adding a depressed trench having a large volume between the core and the cladding. Nevertheless, the position and the depth of the trench can significantly affect the optical fiber's bandwidth Furthermore, although the depressed trench typically improves the bend resistance of the guided modes, it also allows additional modes, called "leaky modes," to co-propagate with the desired guided modes.

These leaky modes exhibit additional losses, called "leakage losses." Typically, wider depressed trenches reduce the leakage losses of the leaky modes. In addition, the deeper the depressed trench (i.e., in terms of absolute value, the bigger the negative refractive index difference of the depressed trench with respect to the outer cladding), the greater the number of leaky modes.

Leaky modes are also present within a regular MMF (i.e., an MMF without any significant improvement in bend resistance), but the existence of the leaky modes is disregarded in practice, because the level of their leakage losses is extremely high.

That said, with conventional trench assistance, the leakage losses of the leaky modes are so reduced that the leaky modes can propagate over several meters and even more, depending on the trench design that is required for compatibility with a regular MMF.

U.S. Patent Application Publication No. 2009/0154888, U.S. Patent Application Publication No. 2008/0166094, Japanese Publication No. 2006-047719, U.S. Patent Application Publication No. 2010/0067858, and U.S. Patent Application Publication No. 2009/169163, each of which is hereby incorporated by reference in its entirety, disclose trench-assisted MMFs. None of these publications, however, discloses the impact of leaky modes.

Commonly assigned French Publication No. 2,949,870 and its counterpart U.S. Patent Publication No. 2011/0058781, each of which is hereby incorporated by reference in its entirety, address the issue of leaky modes. Nevertheless, the publication focuses on the numerical aperture (i.e., on the far field) rather than on the size of the inner core (i.e., the near field) to limit the contribution of the leaky modes.

Thus, there exists a need for a trench-assisted graded-index multimode optical fiber having reduced bending losses that limits the impact of the leaky modes on other optical-fiber characteristics (e.g., core size and numerical aperture).

SUMMARY

Accordingly, in one aspect, the present invention embraces an optical fiber that includes a central core surrounded by an outer cladding (e.g., an outer optical cladding). The central core has an outer radius $r_1$, a maximum refractive index value $n_0$, a minimum refractive index value $n_{cl}$, and a graded-index profile with respect to the outer cladding. The central core also has a relative refractive index difference $\Delta$ defined as follows:

$$\Delta = \frac{n_0^2 - n_{cl}^2}{2n_0^2}.$$

The central core's outer radius $r_1$ is typically between about 22 microns and 28 microns (e.g., between about 23.5 microns and 26.5 microns). The central core's relative refractive index difference $\Delta$ expressed as a percentage is typically about 0.8% or greater.

An inner cladding is positioned between the central core and the outer cladding (e.g., immediately surrounding the central core). The inner cladding has an outer radius $r_2$ and a refractive index difference $\Delta n_2$ with respect to the outer cladding.

A depressed trench is positioned between the inner cladding and the outer cladding (e.g., immediately surrounding the inner cladding). The depressed trench has an outer radius $r_3$ and a negative refractive index difference $\Delta n_3$ with respect to the outer cladding. The depressed trench also has a surface integral $S_3$ of about −20 microns or less, wherein:

$$S_3 = \int_{r_2}^{r_3} 1000\Delta n_3(r)\,dr.$$

Typically, the central core's outer radius $r_1$, the inner cladding's outer radius $r_2$, and the depressed trench's refractive index difference $\Delta n_3$ satisfy the following inequality:

$0.0115807 + 0.0127543 \times (r_2 - r_1) + 0.00241674 \times 1000\Delta n_3 - 0.00124086 \times (r_3 - r_2) \times 1000\Delta n_3 < 4$ percent.

In an exemplary embodiment, the depressed trench's surface integral $S_3$ is about −40 microns or greater (e.g., between −36 microns and −24 microns).

In another exemplary embodiment, the depressed trench's surface integral $S_3$ is about −30 microns or greater (e.g., between −30 microns and −25 microns).

In yet another exemplary embodiment, for a radius of curvature of 5 millimeters at a wavelength of 850 nanometers, the optical fiber has bending losses of less than about 0.3 dB/turn.

In yet another exemplary embodiment, the depressed trench's refractive index difference $\Delta n_3$ is between about $-15 \times 10^{-3}$ and $-5.8 \times 10^{-3}$.

In yet another exemplary embodiment, the difference $r_2 - r_1$ between the inner cladding's outer radius $r_2$ and the central core's outer radius $r_1$ is between about 0.8 micron and 7 microns, such as between about 0.8 micron and 4 microns (e.g., 1-2 microns).

In yet another exemplary embodiment, the inner cladding's refractive index difference $\Delta n_2$ is between about $-0.1 \times 10^{-3}$ and $0.1 \times 10^{-3}$ (e.g., substantially equal to zero).

In yet another exemplary embodiment, when all the guided and leaky modes are excited, the variation in the measurement of the size of the central core between a 2-meter sample of the optical fiber and a 900-meter sample of the optical fiber is about 1 micron or less.

In another aspect, the present invention embraces a multimode optical system that includes an optical fiber in accordance with the foregoing.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a trench-assisted graded-index multimode optical fiber that has reduced bending losses while limiting the impact of the leaky modes on other optical-fiber characteristics (e.g., core size and numerical aperture). To this end, exemplary multimode optical fibers include depressed trenches having particular dimensions (e.g., widths, depths, volumes, and/or surface integrals) at particular locations (i.e., at radial distances from the central core) to prevent or mitigate the deleterious effects of leaky modes, while maintaining reduced bending losses (e.g., "bend insensitivity").

Figure 1:
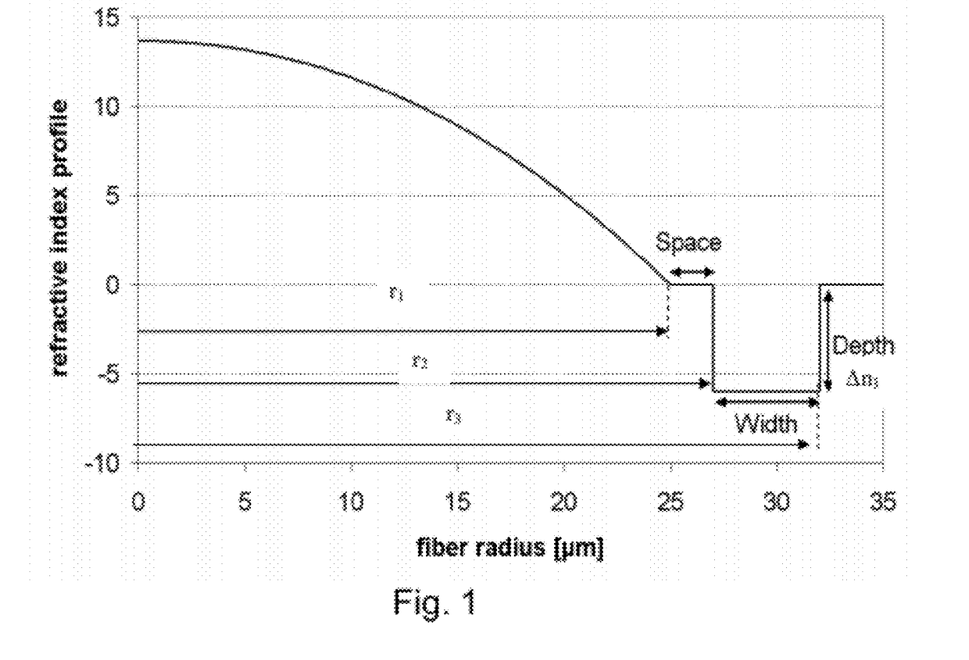
FIG. 1 graphically depicts the refractive index profile of an exemplary optical fiber according to the present invention.

FIG. 1 depicts the refractive index profile of an exemplary optical fiber in accordance with the present invention. The exemplary optical fiber is a multimode optical fiber that includes a central core (e.g., an inner core) surrounded by an outer cladding (e.g., an outer optical cladding). As depicted, the exemplary optical fiber also includes an inner cladding positioned between the central core and the outer cladding (e.g., immediately surrounding the central core). A depressed trench is positioned between the inner cladding and the outer cladding (e.g., immediately surrounding the inner cladding).

The central core has an outer radius $r_1$ that is typically between 22 microns and 28 microns (e.g., 25 microns±1.5 microns), and an alpha profile (i.e., a graded-index profile) relative to the outer cladding.

The central core also has a refractive index difference $\Delta n$ with respect to the outer cladding at the beginning of the alpha profile (e.g., $\Delta n_1 = n_0 - n_g$). As used herein, the expression "beginning of the alpha profile" means the location in the central core where the refractive index profile has a maximum value $n_0$, typically at the center of the central core.

The central core has a refractive index difference $\Delta n_{end}$ with respect to the outer cladding at the end of the alpha profile (e.g., $\Delta n_{end} \approx n_{cl} - n_g$). The expression "end of the alpha profile" means the radial distance beyond which the refractive-index profile is no longer considered to be an "alpha" profile.

The central core has a relative refractive index difference $\Delta$ defined as follows:

$$\Delta = \frac{n_0^2 - n_{cl}^2}{2n_0^2},$$

where $n_0$ is the central core's maximum refractive index value, and $n_{cl}$ is the central core's minimum refractive index value. Typically, $n_{cl}$ is the refractive index of the undoped silica or the refractive index value of the outer cladding. The central core's refractive index difference $\Delta$ expressed as a percentage is typically greater than 8 percent.

The inner cladding has an outer radius $r_2$ and a refractive index difference $\Delta n_2$ with respect to the outer cladding. Typically, the inner cladding's refractive index difference $\Delta n_2$ is between $-0.1 \times 10^{-3}$ and $0.1 \times 10^{-3}$ (e.g., substantially equal to zero as shown in FIG. 1). In some embodiments, the inner cladding is doped (e.g., using germanium) to achieve a positive refractive index difference of between zero and $0.1 \times 10^{-3}$. In other embodiments, the inner cladding is doped (e.g., using fluorine) to achieve a negative refractive index difference of between $-0.1 \times 10^{-3}$ and zero.

The depressed trench has an outer radius $r_3$ and a negative refractive index difference $\Delta n_3$ with respect to the outer cladding.

As shown in FIG. 1, the difference $r_2 - r_1$ (generally expressed in microns) may be referred to as the "space" between the end of the central core and the depressed trench. In FIG. 1, this space corresponds to the inner cladding's width. The difference $r_3 - r_2$ (also generally expressed in microns) may be referred to as the depressed trench's "width." Finally, the value $1000 \times \Delta n_3$ is referred to as the depressed trench's "depth."

In exemplary embodiments, the space between the end of the central core and the depressed trench, the depressed trench's width, and the depressed trench's depth satisfy the following inequality:

$$0.0115807 + 0.0127543 \times (r_2 - r_1) + 0.00241674 \times 1000\Delta n_3 - 0.00124086 \times (r_3 - r_2) \times 1000\Delta n_3 < 4 \text{ percent.}$$

Without being bound to any particular theory, the present inventors have found that the foregoing relationship limits the impact of leaky modes on the optical fiber's performance.

For ease of discussion, the left portion of this inequality, which was obtained through linear regression, will be referred to as "diff." In other words, $$\text{diff} = 0.0115807 + 0.0127543 \times (r_2 - r_1) + 0.00241674 \times 1000\Delta n_3 - 0.00124086 \times (r_3 - r_2) \times 1000\Delta n_3.$$

In this regard, diff is typically less than 3.95 percent (e.g., between about 3.4 and 3.75 percent, such as 3.65 percent), more typically less than 3.5 percent (e.g., between about 2.85 and 3.3 percent, such as 3.1 percent). In exemplary embodiments according to the present invention, diff is less than 3 percent (e.g., between about 2.25 and 2.75 percent, such as 2.5 percent), more typically less than 2 percent (e.g., between about 0.4 and 1.9 percent, such as between 0.75 and 1.75 percent).

Table 1 summarizes data from the simulation of optical-fiber core size after 2 meters and after 900 meters for 60 trench-assisted MMFs (46-micron core) with refractive index profiles exhibiting various space, width, and depth combinations. For purposes of the simulation data presented in Table 1, the parameter "diff" is the relative difference between the optical core size at 900 meters and at 2 meters.

TABLE 1

| width (μm) | space (μm) | depth | diff |
|---|---|---|---|
| 1 | 0.5 | −3 | 1.8% |
| 2 | 0.5 | −3 | 1.7% |
| 2 | 0.5 | −5 | 1.5% |
| 2 | 0.5 | −7 | 1.4% |
| 2 | 0.5 | −9 | 1.4% |
| 4 | 0.5 | −3 | 1.9% |
| 4 | 0.5 | −5 | 2.0% |
| 4 | 0.5 | −7 | 3.0% |
| 4 | 0.5 | −9 | 4.0% |
| 7 | 0.5 | −3 | 3.8% |
| 7 | 0.5 | −5 | 5.8% |
| 7 | 0.5 | −7 | 6.8% |
| 7 | 0.5 | −9 | 7.6% |
| 1 | 1 | −3 | 3.4% |
| 1 | 1 | −5 | 1.9% |
| 1 | 1 | −7 | 1.8% |
| 1 | 1 | −9 | 1.7% |
| 2 | 1 | −3 | 2.0% |
| 2 | 1 | −5 | 1.9% |
| 2 | 1 | −7 | 1.8% |
| 2 | 1 | −9 | 1.8% |
| 4 | 1 | −3 | 2.7% |
| 4 | 1 | −5 | 3.3% |
| 4 | 1 | −7 | 4.5% |
| 4 | 1 | −9 | 5.8% |
| 7 | 1 | −3 | 5.0% |
| 7 | 1 | −5 | 7.6% |
| 7 | 1 | −7 | 9.3% |
| 7 | 1 | −9 | 10.0% |
| 1 | 2.5 | −3 | 5.1% |
| 1 | 2.5 | −5 | 4.6% |
| 1 | 2.5 | −7 | 4.1% |
| 1 | 2.5 | −9 | 4.0% |
| 2 | 2.5 | −3 | 4.7% |
| 2 | 2.5 | −5 | 4.6% |
| 2 | 2.5 | −7 | 4.3% |
| 2 | 2.5 | −9 | 4.5% |

TABLE 1-continued

| width (μm) | space (μm) | depth | diff |
|---|---|---|---|
| 4 | 2.5 | −3 | 5.0% |
| 4 | 2.5 | −5 | 6.2% |
| 4 | 2.5 | −7 | 8.8% |
| 4 | 2.5 | −9 | 11.4% |
| 7 | 2.5 | −3 | 8.7% |
| 7 | 2.5 | −5 | 13.7% |
| 7 | 2.5 | −7 | 15.7% |
| 7 | 2.5 | −9 | 16.6% |
| 1 | 4 | −3 | 5.6% |
| 1 | 4 | −5 | 5.4% |
| 1 | 4 | −7 | 5.5% |
| 1 | 4 | −9 | 5.4% |
| 2 | 4 | −3 | 5.6% |
| 2 | 4 | −5 | 5.7% |
| 2 | 4 | −7 | 5.8% |
| 2 | 4 | −9 | 6.1% |
| 4 | 4 | −3 | 6.2% |
| 4 | 4 | −5 | 8.3% |
| 4 | 4 | −7 | 13.3% |
| 4 | 4 | −9 | 17.7% |
| 7 | 4 | −3 | 12.5% |
| 7 | 4 | −5 | 20.7% |
| 7 | 4 | −7 | 22.7% |
| 7 | 4 | −9 | 16.7% |

Figure 2:
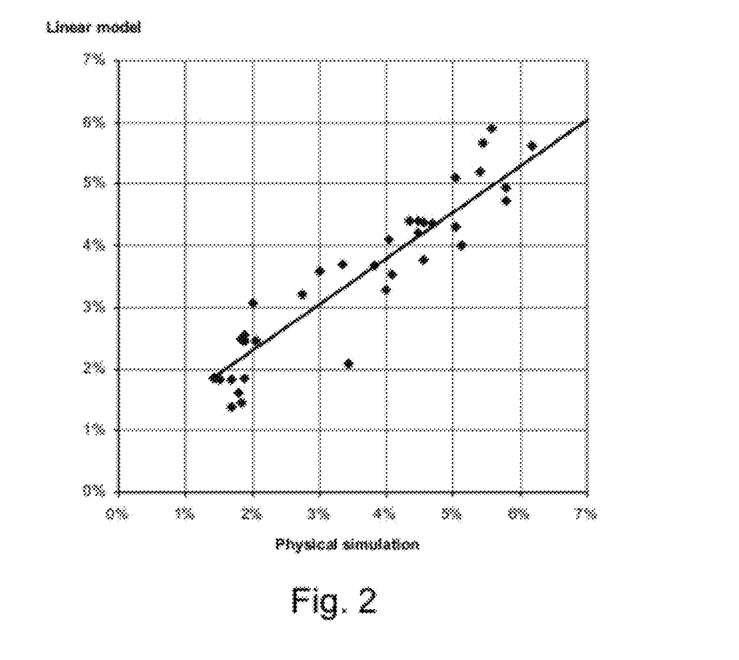
FIG. 2 graphically depicts a comparison of the relative difference between (i) the optical core size at 900 meters and (ii) the optical core size at 2 meters computed according to a linear model and physical simulations.

FIG. 2 graphically depicts a comparison of the relative difference between (i) the optical core size at 900 meters and (ii) the optical core size at 2 meters computed according to a linear model and physical simulations. Thus, FIG. 2 demonstrates the quality of the linear model of the formula for diff.

When diff is less than 4 percent (e.g., less than 3.5 percent), the leaky modes do not significantly disturb the near-field pattern observed at the output of a 2-meter sample of an optical fiber under overfilled launch (OFL). Accordingly, exemplary multimode optical fibers have a diff value of less than 4 percent, typically less than 3.8 percent (e.g., 3.3 percent or less), more typically less than 2.8 percent (e.g., 2.4 percent or less). In some embodiments, exemplary multimode optical fibers have a diff value of less than 2 percent (e.g., between 1 and 1.6 percent, such as 1.4 percent).

Derived core-size measurements may be performed in accordance with IEC 60793-1-20 Method C. The IEC 60793-1-20 technical report is hereby incorporated by reference in its entirety. The IEC 60793-1-20 Method C determines the cross-sectional diameter of an optical fiber's central core by analyzing the near-field light distribution—also called near-field pattern—on a cross-section at the end of the optical fiber under OFL and by calculating the core diameter with or without curve fitting. The difference between the core-size measurements for a 2-meter sample and a 900-meter sample was derived using IEC 60793-1-20 Method C, without curve fitting, directly from the measured pattern at the k level with k=2.5% (where k is the threshold used for defining the core radius). In exemplary embodiments, the difference between these core-size measurements is about 4 percent or less (e.g., between 1.5 and 2.5 percent, such as about 2 percent).

In exemplary embodiments, when all the guided and leaky modes are excited, the variation in measured optical core size between a 2-meter sample of the optical fiber and a 900-meter sample of the optical fiber is 1 micron or less.

To improve bend resistance (i.e., to reduce macrobending losses), exemplary optical fibers include a depressed trench having a substantially constant refractive index difference $\Delta n_a$ and a width $r_3-r_2$ such that $1000\Delta n_2 \times (r_3-r_2)$ is less than −20 microns (i.e., width×depth is less than −20 microns). More generally, in exemplary optical fibers that include a depressed trench having a constant or non-constant refractive index difference $\Delta n_2$, the depressed trench's surface integral $S_3$ is less than −20 microns, where:

$$S_3 = \int_{r_2}^{r_3} 1000\Delta n_3(r)\,dr.$$

In exemplary embodiments, $S_3$ (e.g., $1000\Delta n_2 \times (r_3-r_2)$) is greater than −40 microns (e.g., greater than −35 microns, such as between −30 microns and −25 microns).

The space between the end of the central core and the depressed trench (e.g., the inner cladding) is typically large enough to facilitate the achievement of high bandwidths by adjusting the inner cladding's refractive index difference $\Delta n_2$. In exemplary embodiments, the space $r_2-r_2$ is greater than 0.8 micron (e.g., between 0.8 micron and 7 microns, such as between 0.8 microns and 2 microns).

In exemplary embodiments, the depressed trench's refractive index difference $\Delta n_3$ is between $-15 \times 10^{-3}$ and $-5.8 \times 10^{-3}$ (e.g., between $-10 \times 10^{-3}$ and $-5.8 \times 10^{-3}$).

Tables 2A and 2B, respectively, provide the characteristics of various, exemplary optical fibers. As noted, the parameter "diff" is as follows:

diff=0.0115807+0.0127543×($r_2-r_1$)+0.00241674×
1000$\Delta n_3$−0.00124086×($r_3-r_2$)×1000$\Delta n_3$.

TABLE 2A

| width (μm) | space (μm) | depth | diff | width × depth (μm) |
|---|---|---|---|---|
| 3.4 | 1 | −5.88235 | 3.5% | −20 |
| 3.7 | 1 | −6.75676 | 3.9% | −25 |
| 3.2 | 1 | −9.375 | 3.9% | −30 |
| 2.9 | 1 | −12.069 | 3.9% | −35 |

TABLE 2B

| width (μm) | space (μm) | depth | diff | width × depth (μm) |
|---|---|---|---|---|
| 2.2 | 0.2 | −10 | 1.73% | −22.0 |
| 2.3 | 0.1 | −11 | 1.77% | −25.3 |
| 2.2 | 0.2 | −15 | 1.88% | −33.0 |
| 1.8 | 0.8 | −12 | 1.96% | −21.6 |

The macrobending losses of these exemplary optical fibers primarily depend on the product of the depressed trench's depth×width. Tables 3A and 3B, respectively, provide the characteristics of various, exemplary 50-micron MMFs with different values of that product. Macrobending losses are measured at 850 nanometers according to the ITU-T G.651.1 Recommendations under specific launching conditions defined in the IEC 60793-1-47 standard. The ITU G651.1 Recommendations and the IEC 60793-1-47 standard are hereby incorporated by reference in their entireties. "BL 2-turns @ 5 mm" denotes the macrobending losses for two turns and for a radius of curvature of 5 millimeters.

TABLE 3A

| width (μm) | space (μm) | depth | width × depth (μm) | BL 2-turns@ 5 mm (dB) | diff |
|---|---|---|---|---|---|
| 6.3 | 1.3 | −6.6 | −41.6 | 0.100 | 6.4% |
| 6.3 | 1.3 | −0.6 | −3.8 | 2.000 | 3.1% |
| 4.0 | 1.0 | −3.5 | −14.0 | 0.627 | 3.3% |

TABLE 3A-continued

| width (μm) | space (μm) | depth | width × depth (μm) | BL 2-turns@ 5 mm (dB) | diff |
|---|---|---|---|---|---|
| 4.2 | 1.0 | −9.5 | −39.5 | 0.089 | 5.1% |
| 4.0 | 1.0 | −12.9 | −52.0 | 0.021 | 5.8% |
| 3.6 | 1.0 | −6.2 | −22.2 | 0.272 | 3.7% |
| 4.0 | 1.0 | −12.9 | −51.8 | 0.015 | 5.7% |
| 4.0 | 1.0 | −7.6 | −30.3 | 0.132 | 4.4% |

TABLE 3B

| width (μm) | space (μm) | depth | width × depth (μm) | BL 2-turns@ 5 mm (dB) | diff |
|---|---|---|---|---|---|
| 2.2 | 0.2 | −10 | −22.0 | 0.339 | 1.73% |
| 2.3 | 0.1 | −11 | −25.3 | 0.258 | 1.77% |
| 2.2 | 0.2 | −15 | −33.0 | 0.124 | 1.88% |
| 1.8 | 0.8 | −12 | −21.6 | 0.352 | 1.96% |

Although the exemplary optical fibers of Tables 3A and 3B have comparable macrobending losses, the exemplary optical fibers of Table 3B, which have lower diff values, exhibit lower leaky mode contribution. By way of illustration, the exemplary optical fiber including a depressed trench of width 3.6 microns has macrobending losses that might be improved, but its leaky mode contribution to the near field is too large. This is reflected in the diff value, which is greater than 2 percent for this particular optical fiber.

Figure 3:
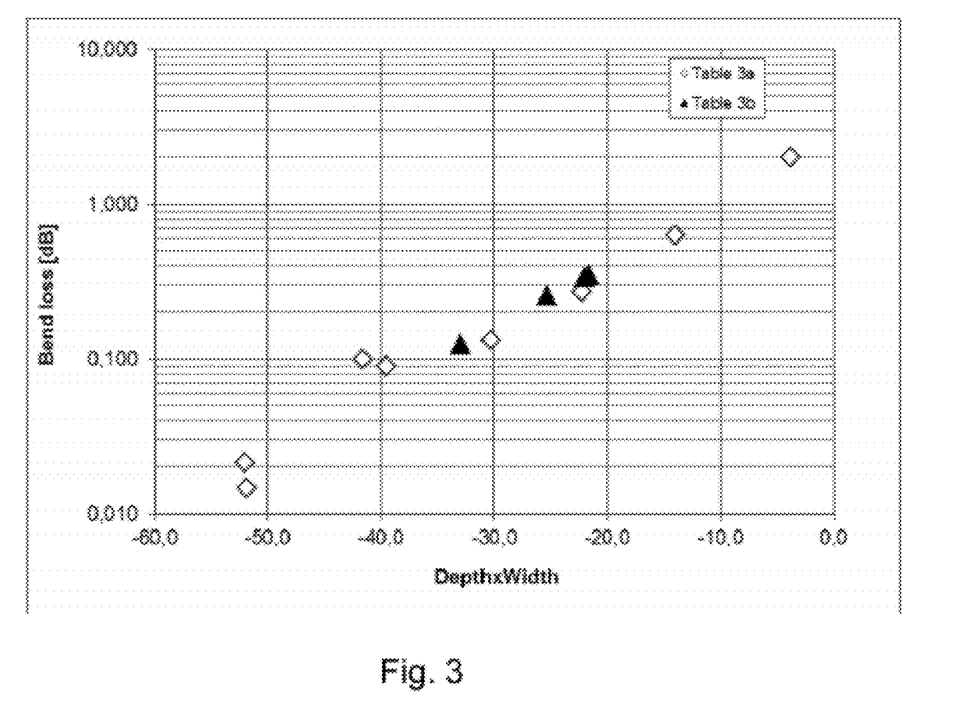
FIG. 3 graphically depicts, for two turns around a radius of curvature of 5 millimeters at a wavelength of 850 nanometers, bending losses as a function of the depressed trench's depth times the depressed trench's width for exemplary optical fibers.

FIG. 3 plots the exemplary optical fibers of Table 3A (open diamonds) and exemplary optical fibers of Table 3B (closed triangles). In FIG. 3, bending losses (in dB) are plotted as a function of the product of the depressed trench's depth× width. As shown, for a radius of curvature of 5 millimeters at a wavelength of 850 nanometers, the exemplary optical fibers exhibit macrobending losses of less than 0.4 dB/turn. Accordingly, exemplary embodiments in accordance with the present invention offer high bend resistance as well as a reduction in the number of leaky modes.

Exemplary optical fibers exhibit an improved dispersion mode delay (DMD) to meet the requirements of the OM3 and OM4 standards, each of which is hereby incorporated by reference in its entirety. The OM3 standard requires, at a wavelength of 850 nanometers, an EMB of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700 MHz·km to obtain error-free transmissions for a data rate of 10 Gb/s (10 GbE) up to a distance of 400 meters.

Table 4 provides the DMD Specifications for optical fibers in compliance with the OM3 standard.

TABLE 4

DMD Specifications for OM3 Fibers

| Specifications | Inner DMD | Outer DMD | Sliding DMD |
|---|---|---|---|
| 1 | ≤0.33 | ≤0.33 | ≤0.25 |
| 2 | ≤0.27 | ≤0.35 | ≤0.25 |
| 3 | ≤0.26 | ≤0.40 | ≤0.25 |
| 4 | ≤0.25 | ≤0.50 | ≤0.25 |
| 5 | ≤0.24 | ≤0.60 | ≤0.25 |
| 6 | ≤0.23 | ≤0.70 | ≤0.25 |

OM3 fibers fulfill at least one of these six specifications. Outer, inner, and sliding DMD values are expressed in ps/m.

Table 5 provides the DMD Specifications for optical fibers in compliance with the OM4 standard.

TABLE 5

DMD Specifications for OM4 Fibers

| Specifications | Inner DMD | Outer DMD | Sliding DMD |
|---|---|---|---|
| 1 | ≤0.10 | ≤0.30 | ≤0.11 |
| 2 | ≤0.11 | ≤0.17 | ≤0.11 |
| 3 | ≤0.14 | ≤0.14 | ≤0.11 |

OM4 fibers fulfill at least one of these three specifications. Outer, inner, and sliding DMD values are expressed in ps/m.

The standards define three DMD values with their respective masks named inner, outer and sliding. The inner mask extends from 5 microns up to 18 microns, and the outer mask from 0 microns to 23 microns. The sliding masks are 5-micron-width masks that successively start at 7, 9, 11 and 13 micron offsets.

The DMD values correspond to the delay between the fastest and the slowest pulses within a given sub-group of offset launches, also called masks, based on the rise and fall time at quarter maximum and taking into account the FWQM of the reference input pulse. They are computed from the DMD plot obtained from the DMD measurements that include measuring pulse responses of the optical fiber for single-mode launches that radially scan the optical-fiber core.

Employing appropriate values of $r_2-r_2$, $\Delta n_2$ and $\Delta n_3$, achieves compliant DMD values. Moreover, because macrobending losses are reduced, the DMD values are likely to be unchanged under bends.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns.

(Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist").

Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non-Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. Patent Application Publication No. 2012/0051703 A1 for a Single-Mode Optical Fiber, filed Jul. 1, 2011, (Bigot-Astruc et al.); U.S. Patent Application Publication No. 2012/0040184 A1 for a Method of Fabricating an Optical Fiber Preform, filed Aug. 10, 2011, (de Montmorillon et al.); U.S. patent application Ser. No. 13/275,921 for a Multimode Optical Fiber Insensitive to Bending Losses, filed Oct. 18, 2011, (Molin et al.); U.S. patent application Ser. No. 13/303,967 for a Radiation-Insensitive Optical Fiber Doped with Rare Earths, filed Nov. 23, 2011, (Burov et al.); U.S. patent application Ser. No. 13/315,712 for a Rare-Earth-Doped Optical Fiber, filed Dec. 9, 2011, (Boivin et al.); U.S. patent application Ser. No. 13/410,976 for a Rare-Earth-Doped Amplifying Optical Fiber, filed Mar. 2, 2012, (Burov et al.); and U.S. patent application Ser. No. 13/428,520 for a Bend-Resistant Multimode Optical Fiber, filed Mar. 23, 2012, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Pat. No. 8,145,026 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.);

U.S. Patent Application Publication No. 2012/0014652 A1 for a Adhesively Coupled Optical Fibers and Enclosing Tape, filed Jul. 13, 2011, (Parris); U.S. Patent Application Publication No. 2012/0040105 A1 for a Method and Apparatus Providing Increased UVLED Intensity, filed Aug. 10, 2011, (Overton); U.S. Patent Application Publication No. 2012/0057833 A1 for an Optical-Fiber Module Having Improved Accessibility, filed Aug. 31, 2011, (Tatat); U.S. patent application Ser. No. 13/362,357 for a Broad-Bandwidth Optical Fiber, filed Jan. 31, 2012, (Molin et al.); U.S. patent application Ser. No. 13/362,395 for a Multimode Optical Fiber, filed Jan. 31, 2012, (Molin et al.); and U.S. patent application Ser. No. 13/401,026 for a Optical-Fiber Interconnect Cable, filed Feb. 21, 2012, (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
a central core surrounded by an outer optical cladding, said central core having (i) a graded-index profile with respect to said outer optical cladding, (ii) an outer radius $r_1$ of between about 22 microns and 28 microns, (iii) a maximum refractive index value $n_0$, (iv) a minimum refractive index value $n_{cl}$, and (v) a relative refractive index difference:

$$\Delta = \frac{n_0^2 - n_{cl}^2}{2n_0^2};$$

an inner cladding positioned between said central core and said outer cladding, said inner cladding having (i) an outer radius $r_2$ and (ii) a refractive index difference $\Delta n_2$ with respect to said outer optical cladding; and
a depressed trench positioned between said inner cladding and said outer optical cladding, said depressed trench having (i) an outer radius $r_3$, (ii) a refractive index difference $\Delta n_3$ with respect to said outer optical cladding, and (iii) a surface integral $S_3$:

$$S_3 = \int_{r_2}^{r_3} 1000\Delta n_3(r)\,dr;$$

wherein, expressed as a percentage, the relative refractive index difference $\Delta$ is greater than 0.8 percent;
wherein said central core's outer radius $r_1$, said inner cladding's outer radius $r_2$, and said depressed trench's refractive index difference $\Delta n_3$ satisfy the following inequality:

0.0115807+0.0127543×($r_2$−$r_1$)+0.00241674×1000Δ$n_3$−0.00124086×($r_3$−$r_2$)×1000Δ$n_3$<3.5 percent; and wherein said depressed trench's surface integral $S_3$ is about −20 microns or less.

2. The optical fiber according to claim 1, wherein the difference $r_2$−$r_1$ between said inner cladding's outer radius $r_2$ and said central core's outer radius $r_1$ is between about 0.8 micron and 7 microns.

3. The optical fiber according to claim 1, wherein the difference $r_2$−$r_1$ between said inner cladding's outer radius $r_2$ and said central core's outer radius $r_1$ is between about 1 micron and 2 microns.

4. The optical fiber according to claim 1, wherein said inner cladding's refractive index difference $\Delta n_2$ is between about $-0.1 \times 10^{-3}$ and $0.1 \times 10^{-3}$.

5. The optical fiber according to claim 1, wherein said depressed trench's refractive index difference $\Delta n_3$ is between about $-15 \times 10^{-3}$ and $-5.8 \times 10^{-3}$.

6. The optical fiber according to claim 1, wherein said central core's outer radius $r_1$, said inner cladding's outer radius $r_2$, and said depressed trench's refractive index difference $\Delta n_3$ satisfy the following inequality:

1.4 percent<0.0115807+0.0127543×($r_2$−$r_1$)+0.00241674×1000Δ$n_3$−0.00124086×($r_3$−$r_2$)×1000Δ$n_3$<3.3 percent.

7. The optical fiber according to claim 1, wherein said central core's outer radius $r_1$, said inner cladding's outer radius $r_2$, and said depressed trench's refractive index difference $\Delta n_3$ satisfy the following inequality:

1.7 percent<0.0115807+0.0127543×($r_2$−$r_1$)+0.00241674×1000Δ$n_3$−0.00124086×($r_3$−$r_2$)×1000Δ$n_3$<3 percent.

8. The optical fiber according to claim 1, wherein said central core's outer radius $r_1$, said inner cladding's outer radius $r_2$, and said depressed trench's refractive index difference $\Delta n_3$ satisfy the following inequality:

0.0115807+0.0127543×($r_2$−$r_1$)+0.00241674×1000Δ$n_3$−0.00124086×($r_3$−$r_2$)×1000Δ$n_3$<2 percent.

9. The optical fiber according to claim 1, wherein said depressed trench's surface integral $S_3$ is about −40 microns or greater.

10. The optical fiber according to claim 1, wherein said depressed trench's surface integral $S_3$ is between about −35 microns and −25 microns.

11. The optical fiber according to claim 1, wherein, for a radius of curvature of 5 millimeters at a wavelength of 850 nanometers, the optical fiber has macrobending losses of less than about 0.3 dB/turn.

12. The optical fiber according to claim 1, wherein, when all the guided and leaky modes are excited, the difference between (i) measured optical core size for a 2-meter sample of the optical fiber and (ii) measured optical core size for a 900-meter sample of the optical fiber is about 1 micron or less.

13. An optical system comprising the optical fiber according to claim 1.

14. A multimode optical fiber, comprising:
a central core surrounded by an outer optical cladding, said central core having (i) a graded-index profile with respect to said outer optical cladding, (ii) an outer radius $r_1$, (iii) a maximum refractive index value $n_0$, (iv) a minimum refractive index value $n_{cl}$, and (v) a relative refractive index difference:

$$\Delta = \frac{n_0^2 - n_{cl}^2}{2n_0^2};$$

an inner cladding positioned between said central core and said outer cladding, said inner cladding having (i) an outer radius $r_2$ and (ii) a refractive index difference $\Delta n_2$ with respect to said outer optical cladding; and a depressed trench positioned between said inner cladding and said outer optical cladding, said depressed trench having (i) an outer radius $r_3$, (ii) a refractive index difference $\Delta n_3$ with respect to said outer optical cladding, and (iii) a surface integral $S_3$:

$$S_3 = \int_{r_2}^{r_3} 1000\Delta n_3(r)\, dr;$$

wherein, expressed as a percentage, the relative refractive index difference $\Delta$ is greater than 0.8 percent;

wherein said central core's outer radius $r_1$, said inner cladding's outer radius $r_2$, and said depressed trench's refractive index difference $\Delta n_3$ satisfy the following inequality:

0.0115807+0.0127543×$(r_2-r_1)$+0.00241674×1000$\Delta n_3$−0.00124086×$(r_3-r_2)$×1000$\Delta n_3$<4 percent; and wherein said depressed trench's surface integral $S_3$ is between −40 microns and −25 microns.

15. The optical fiber according to claim 14, wherein said central core has an outer radius $r_1$ of between about 23.5 microns and 26.5 microns.

16. The optical fiber according to claim 14, wherein:
said inner cladding's refractive index difference $\Delta n_2$ is between about −0.1×10⁻³ and 0.1×10⁻³; and
the difference $r_2-r_1$ between said inner cladding's outer radius $r_2$ and said central core's outer radius $r_1$ is between about 0.8 microns and 4 microns.

17. The optical fiber according to claim 14, wherein said depressed trench's refractive index difference $\Delta n_3$ is between about −15×10⁻³ and −5.8×10⁻³.

18. The optical fiber according to claim 14, wherein said central core's outer radius $r_1$, said inner cladding's outer radius $r_2$, and said depressed trench's refractive index difference $\Delta n_3$ satisfy the following inequality:

1.9 percent<0.0115807+0.0127543×$(r_2-r_1)$+0.00241674×1000$\Delta n_3$−0.00124086×$(r_3-r_2)$×1000$\Delta n_3$<3.4 percent.

19. The optical fiber according to claim 14, wherein said central core's outer radius $r_1$, said inner cladding's outer radius $r_2$, and said depressed trench's refractive index difference $\Delta n_3$ satisfy the following inequality:

1.5 percent<0.0115807+0.0127543×$(r_2-r_1)$+0.00241674×1000$\Delta n_3$−0.00124086×$(r_3-r_2)$×1000$\Delta n_3$<2.7 percent.

20. The optical fiber according to claim 14, wherein said central core's outer radius $r_1$, said inner cladding's outer radius $r_2$, and said depressed trench's refractive index difference $\Delta n_3$ satisfy the following inequality:

0.0115807+0.0127543×$(r_2-r_1)$+0.00241674×1000$\Delta n_3$−0.00124086×$(r_3-r_2)$×1000$\Delta n_3$<2 percent.

21. The optical fiber according to claim 14, wherein, for a radius of curvature of 5 millimeters at a wavelength of 850 nanometers, the optical fiber has macrobending losses of less than about 0.3 dB/turn.

22. The optical fiber according to claim 14, wherein, when all the guided and leaky modes are excited, the difference between (i) measured optical core size for a 2-meter sample of the optical fiber and (ii) measured optical core size for a 900-meter sample of the optical fiber is about 1 micron or less.

* * * * *